(No Model.)
F. WHEATON.
FEED BAG FOR HORSES.
No. 255,740. Patented Mar. 28, 1882.
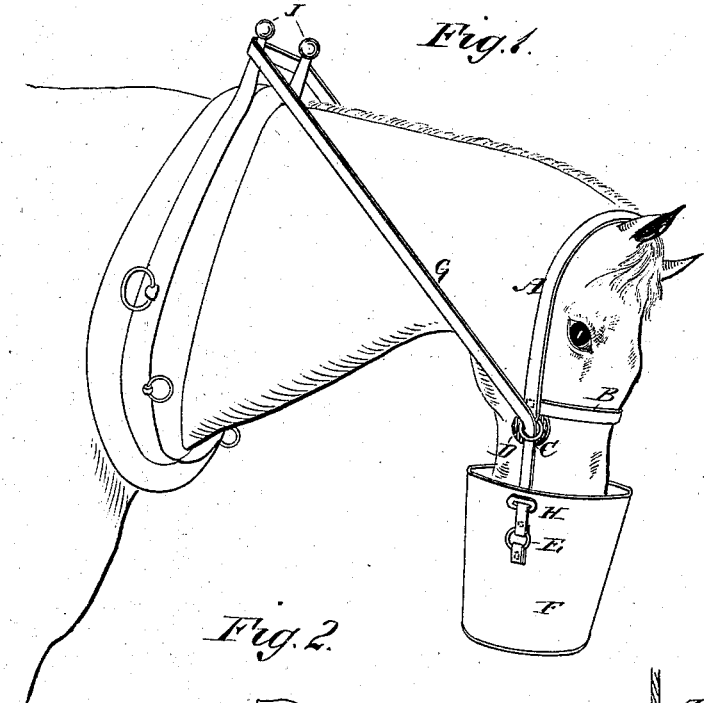
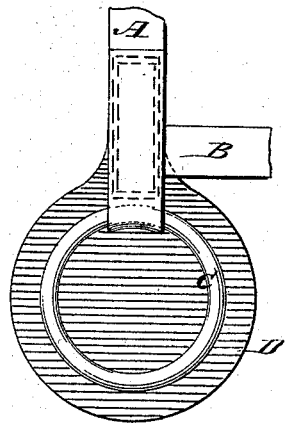
WITNESSES:
INVENTOR:
F. Wheaton
BY
ATTORNEYS.

United States Patent Office.

FRANK WHEATON, OF BROOKLYN, NEW YORK.

FEED-BAG FOR HORSES.

SPECIFICATION forming part of Letters Patent No. 255,740, dated March 28, 1882.

Application filed January 20, 1882. (No model.)

*To all whom it may concern:*

Be it known that I, FRANK WHEATON, of Brooklyn, Eastern District, in the county of Kings and State of New York, have invented a new and Improved Feed-Bag for Horses, of which the following is a full, clear, and exact description.

The object of my invention is to provide a new and improved device for suspending a feed-bag from the headstall of a horse's harness, so made that the horse can reach the bottom of the bag without being chafed by the straps supporting the bag.

The invention consists of a headstall provided with a nose-band, rings at its ends, and a protecting-pad under the rings, in combination with a feed-bag and strap secured to the feed-bag and passing through the rings to and around the hames, as hereinafter described.

Reference is to be had to the accompanying drawings, forming a part of this specification, in which similar letters of reference indicate corresponding parts in all the figures.

Figure 1 is a perspective view of my improved feed-bag holder, showing the manner in which it is supported from the headstall. Fig. 2 is a side elevation of the loop or ring through which the bag-supporting strap or rope passes, showing the projecting plate at the inner side of the ring. Fig. 3 is a cross-sectional elevation of the same with the bag-supporting strap passed through the ring.

The headstall A, provided with a nose-band, B, has a ring or loop, C, attached to each end. A leather disk or plate, D, is attached to each end of the headstall on the inner surface, the rings C resting on this disk D and the disks resting against the horse's cheeks or against the sides of the horse's head. A loop or ring, E, is fastened to each side of the feed-bag F, and to these loops the ends of a strap or rope, G, are attached, this strap or rope passing from the outside to the inside through apertures or slots H in the feed-bag above the loops E. The strap or rope G then passes through one ring or loop C at one end of the headstall, around the upper ends of the hames J, through the loop C at the other end of the headstall, and to the other loop, E, of the feed-bag. The feed-bag F is thus suspended from the hames J by the strap or rope G. If the horse moves its head downward, the feed-bag will be drawn upward and the horse can get to the bottom of the bag, and so soon as the horse raises its head the bag will descend and the horse can take its nose out of the bag, as horses like to do when they chew.

A special advantage of my device is, that the strap or rope is not bent at one acute angle or right angle, but at an obtuse angle at the loops C, whereby the friction will be materially diminished, the bag can be raised and lowered very easily, and the strap or rope G is not apt to crack or break. The disks or plates D prevent the strap or rope G from chafing and rubbing the skin of the horse at the side of the head, which this strap would do if the protecting-plates had not been provided, for the strap does not always rest flat against the side of the horse's head, and the edges of the strap are very apt to chafe and rub the skin.

I am aware that the ends of a strap have been attached to a collapsible feed-bag and passed through loops at the junction of the check-strap and brow-band to and around the upper ends of the hames, and I therefore do not claim such; but What I do claim, and desire to secure by Letters Patent, is—

The headstall A, provided with the nose-band B, the rings C at its ends, and the protecting-disks D, secured to the said ends under the rings, in combination with the feed-bag F, provided with the slots H and the rings E, and the strap G, secured to the rings E, passing through the slots H and the rings C to and around the upper ends of the hames, substantially as and for the purpose set forth.

FRANK WHEATON.

Witnesses:
OSCAR F. GUNZ,
C. SEDGWICK.